March 1, 1955     M. P. BLOMBERG     2,703,056

RAILWAY TRUCK

Filed May 3, 1949     3 Sheets-Sheet 1

Inventor
Martin P. Blomberg
By Spencer, Willits, Helwig, Bailto
Attorneys

March 1, 1955 M. P. BLOMBERG 2,703,056
RAILWAY TRUCK
Filed May 3, 1949 3 Sheets-Sheet 2

Inventor
Martin P. Blomberg
By
Spencer, Willis, Helmig & Baillio
Attorneys

March 1, 1955 M. P. BLOMBERG 2,703,056
RAILWAY TRUCK
Filed May 3, 1949 3 Sheets-Sheet 3

Inventor
Martin P. Blomberg
By
Spencer Willits, Helwig & Baillio
Attorneys

United States Patent Office 2,703,056
Patented Mar. 1, 1955

2,703,056

RAILWAY TRUCK

Martin P. Blomberg, Hinsdale, Ill., assignor to General Motors Corporation, Detroit, Mich., a corporation of Delaware Application May 3, 1949, Serial No. 91,058

6 Claims. (Cl. 105—188)

The present invention relates to railway vehicles and more particularly to railway vehicle trucks.

Railways both here and abroad have many branch lines on which lightweight rail is used, making it necessary to restrict the axle loading of the rolling stock operated thereon. Locomotives for use on such lines require multi-axle trucks to maintain the axle loading within the limits imposed by the light rail and bridges, and, as these trucks usually have each axle driven by a nose suspended traction motor, the truck frame and bolster are long and of complicated form to clear the traction motors and still provide supporting means for the bolster and traction motors and brake rigging. There is also a need for varying the axial displacement of the wheels on the axles to accommodate these trucks for different gauge track especially on foreign railways.

The principal object of the present invention is to provide a multi-axle short wheel base truck having a truck frame and bolster of short length and simple form mounted on the axles having means thereon to vary the axial spacing of the wheels and simple compact bolster suspension means on the frame to cushion vertical and lateral motion of the bolster above the frame and thereby provide sufficient clearance for the mounting of a nose suspended traction motor between each axle and the truck frame and means on the frame and bolster to limit relative movement therebetween, certain of the motion limiting means on the truck frame also serving for properly supporting the brake rigging adjacent the wheels for different axial spacing thereof on the axles.

The combination of truck structures by which the above object is accomplished together with other novel features thereof will become apparent by reference to the following detailed description and drawings illustrating one form of the invention which is particularly adaptable for use on electric traction motor driven locomotives.

Figure 1 of the drawings is a side elevational view of my traction truck.

Figure 1:
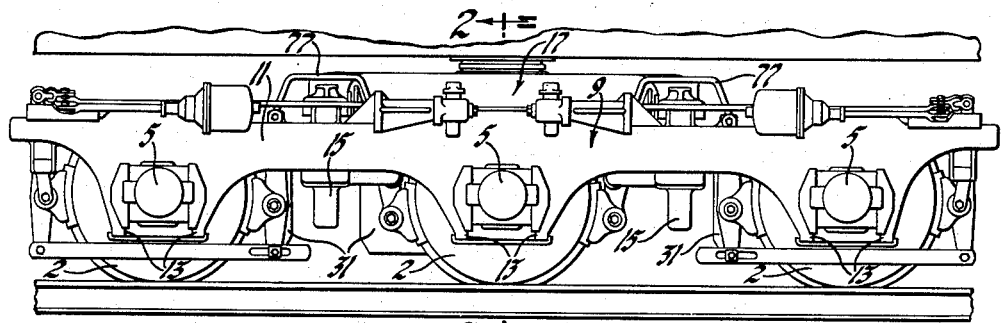
Figure 2:
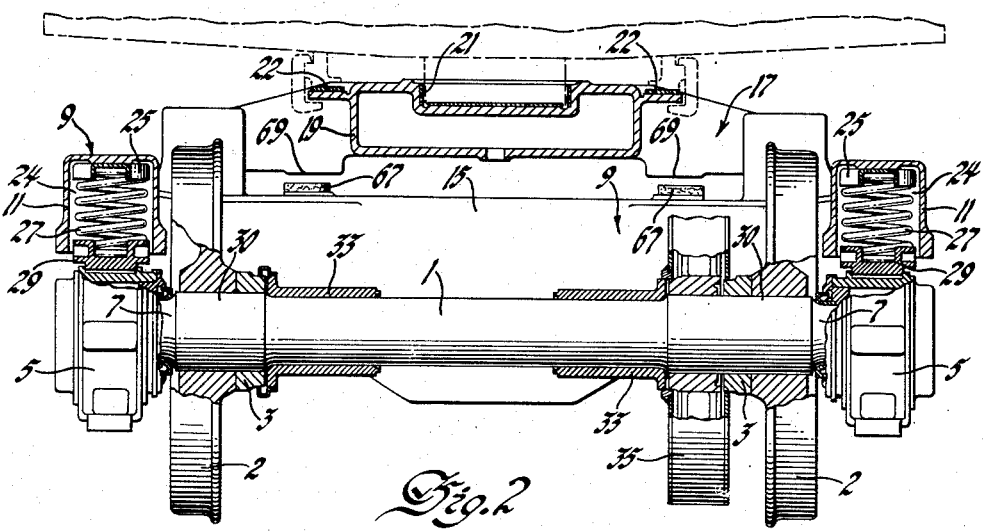
Figure 2 is an enlarged transverse sectional view taken on line 2—2 of Figure 1 with parts shown broken away and in section.
Figure 4:
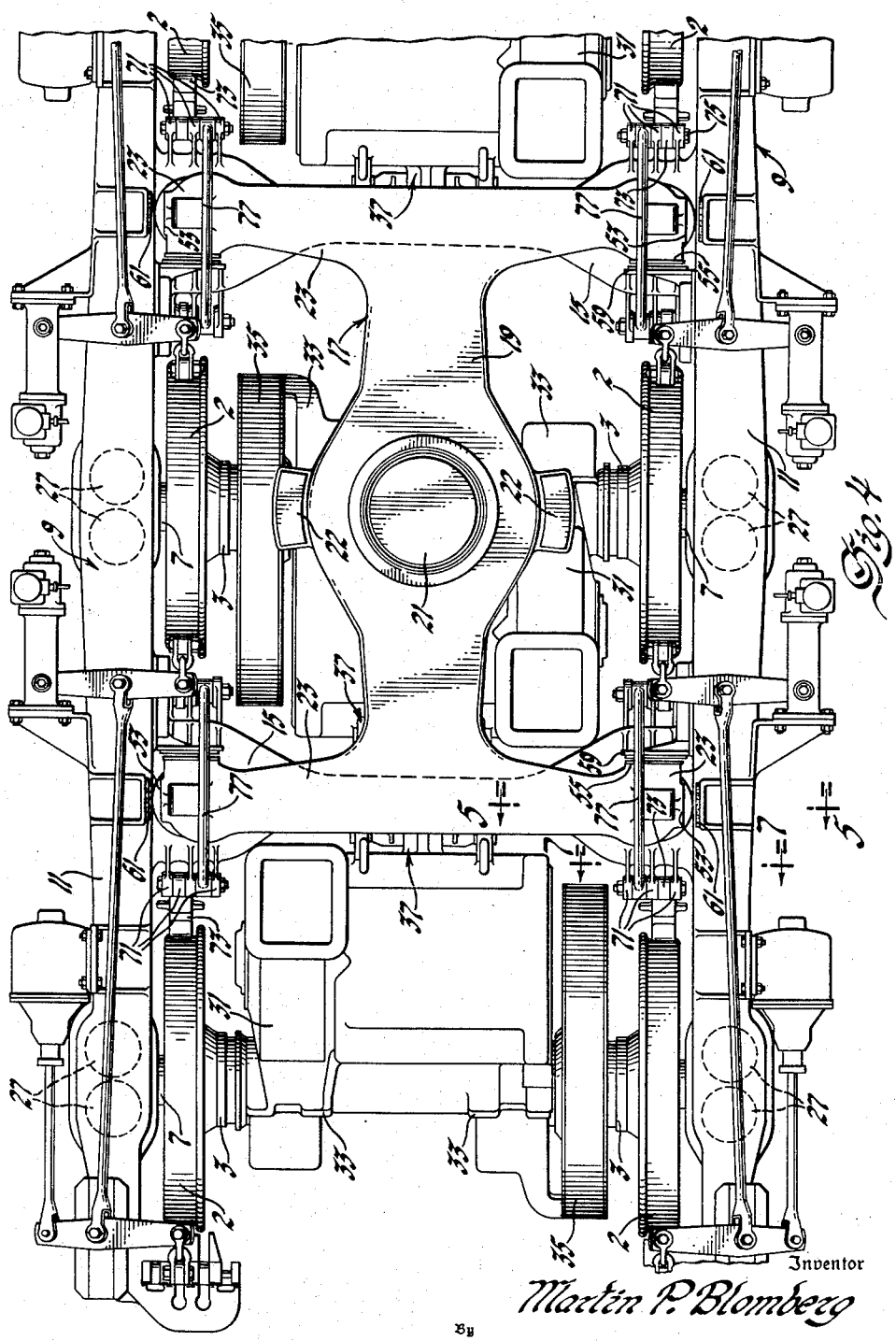
Figure 4 is an enlarged top plan view of the truck.

As best seen in Figures 1, 2 and 4, the truck assembly comprises three axles 1, each having a pair of wheels 2 and spacing collars 3 pressed thereon, journal boxes 5 mounted on the outer end, journal portions 7 of each axle, a truck frame, generally indicated by the character reference 9, having side portions 11 including vertical pedestal jaw portions 13, shown embracing the opposite end faces of the journal boxes 5, transverse frame portions 15, shown extending between the side portions 11 intermediate the adjacent axles and a bolster, generally indicated at 17 including a longitudinally extending portion 19 having a central circular depressed center plate portion 21, side bearings 22 and end portions 23 extending transversely above the transverse portions 15 of the truck frame 9.

Figure 3:
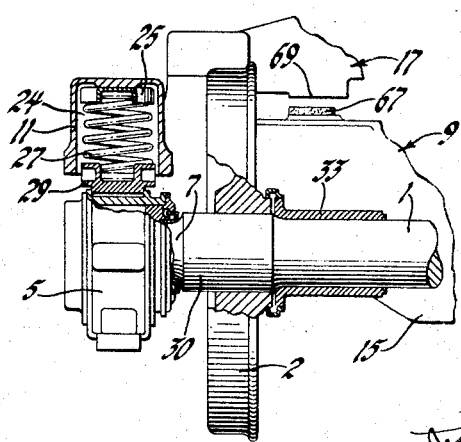
Figure 3 is a view similar to Figure 2 with certain of the parts shown in different relation and broken away and in section.

As best seen in Figures 2 and 3 the cross section of each truck side frame portion 11 intermediate the pedestal jaws 13 and above each of the journal boxes 5 is of inverted U form to serve as a spring pocket 24. Spring seats 25 are seated in the upper ends of each of these pockets 24 upon which the upper ends of two helical compression springs 27 bear. The lower ends of these springs are in contact with lower spring seats 29, supported in depressions formed in the upper faces of the journal boxes 5 to resiliently support the truck frame on the journal boxes. It will be noted in Figure 2 that wheels 2 are pressed on the outer larger diameter end portions of the axle wheel seating surfaces 30 adjacent the outer end journal portions 7 and in abutting relation with the outer faces of the wheel spacing collars 3 which are pressed on the inner ends of the seating surfaces with the inner faces flush with the inner face of these surfaces for operation on standard gauge track. In Figure 3 no spacing collars 3 are used, the wheels then being pressed on the inner ends of axle wheel seating surfaces 30 with the inner end wheel hub face flush with the inner edge of the seating surface 30 for operation on a narrow gauge track.

As best seen in Figures 1, 2 and 4 an electric traction motor 31 having axle box bearings 33 at one end supported on each axle adjacent the inner annular face of the wheel seating surfaces 30 and connected in driving relation with the axle by suitable gearing included in a removable gear case 35 in conventional manner. Each motor 31 is provided with the usual nose support on the other end engageable with resilient motor nose supporting means of conventional type, generally indicated by the character reference 37 on each of the adjacent faces of the transverse truck frame portions 15. It will be noted that separate motor nose supporting means 37 are provided on the opposite end faces of one of these transverse truck frame portions 15 for the motor driving one end truck axle and also for the motor driving the center truck axle.

Figure 5:
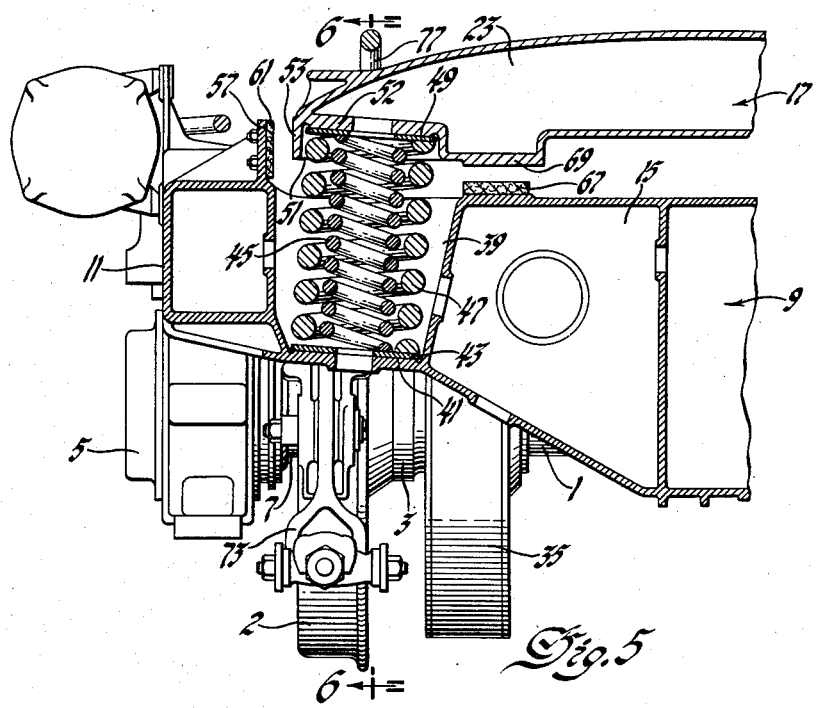
Figure 5 is an enlarged transverse sectional view taken on line 5—5 of Figure 4 with parts shown broken away and in section.

As best illustrated in Figure 5 a bolster spring pocket 39 is formed at the junction of the ends of the transverse truck frame portions 15 with the side frame portions 11. It will be noted that the lower surface 41 of each of the four spring pockets 39 is inclined transversely inwardly and downwardly and a spring pad 43 is shown in engagement therewith. Two nested helical compression springs 45—47 are supported at the lower ends on each of the pads 43 and the axis of these springs is accordingly inclined transversely inwardly and upwardly out of the pockets, the upper transversely opposite sides of which diverge upwardly and outwardly to provide upper end side clearance for the springs. The upper ends of each of the springs 45—47 engage a pad 49 in a downwardly opening pocket 51 formed in each of the outer ends of each of the transversely extending end portions 23 of the bolster 17. The upper face 52 of each of the four bolster pockets 51 engaged by one of the spring pads 49 is parallel with the bottom face of the pocket 39 in the truck frame below it. The transverse inwardly and upwardly inclined springs 45—47 in the opposite side pockets 39—51 of the truck frame 9 and bolster 17 accordingly serve to cushion vertical movement therebetween and normally position the bolster in centered relation over the truck frame and to resiliently oppose relative lateral swinging movement of the bolster relative to the truck frame from the centered position.

Figures 6, 7:
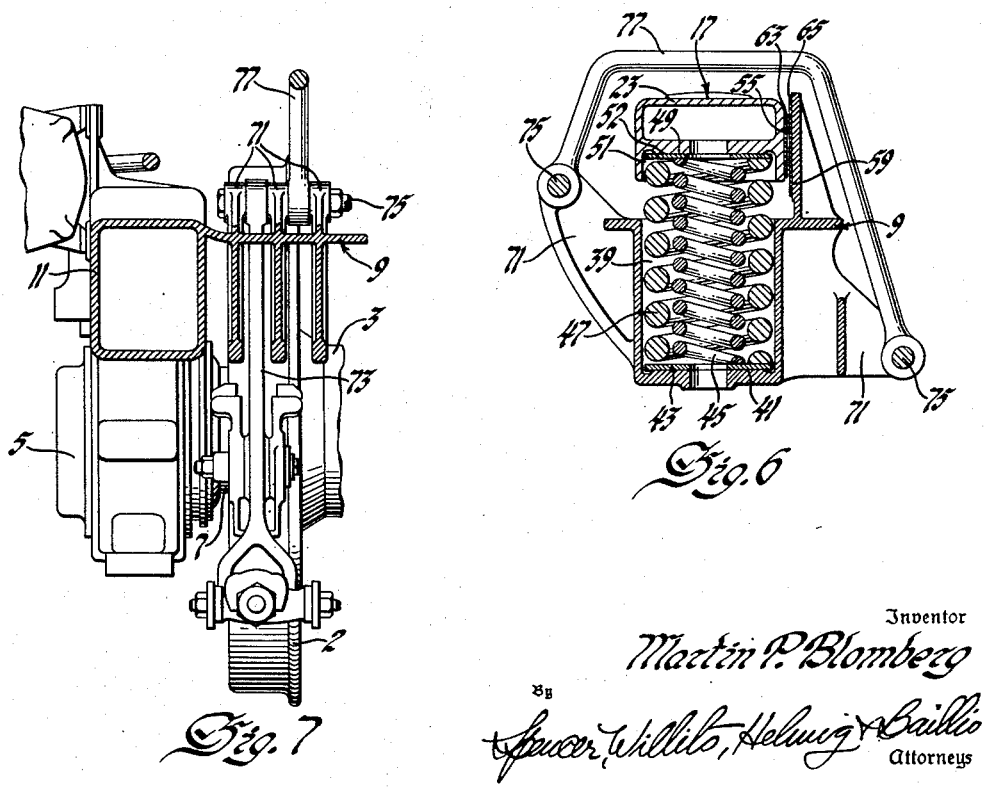
Figure 6 is a partial longitudinal sectional view taken on line 6—6 of Figure 5 with parts broken away and in section.
Figure 7 is an enlarged partial transverse sectional view taken on line 7—7 of Figure 4 with parts broken away and in section.

As best seen in Figures 5 and 6 each of the outer ends of the transversely extending bolster end portions 23 adjacent a spring pocket 51 is provided with a transversely outwardly facing limit stop surface 53 and a longitudinally inwardly facing limit stop surface 55. The truck frame side portions 11 are each provided with two upstanding lateral motion limit stop surfaces 57 for the bolster, facing these bolster lateral motion limit stop surfaces 53, and also two upstanding longitudinal motion limit stop surfaces 59 for the bolster facing longitudinally outwardly toward the bolster stop surfaces 55. A cushion 61 is secured to each of the lateral motion stop surfaces 57 on the truck frame and wear plates 63—65 are secured to the longitudinally facing surfaces of the bolster and truck frame. It will be noted that there is little longitudinal clearance between the wear plates 63—65 on the longitudinally facing stop surfaces of the bolster and truck frame and much greater transverse clearance is provided between the wear cushions 61 on the truck frame surfaces facing the stop surfaces 53 on the bolster so that greater relative lateral swinging movement than longitudinal movement is permitted between the bolster and truck frame. Cushions 67 are secured on the upper face of each transverse truck frame portion 15 adjacent the inner side of each spring pocket 39 directly below downwardly facing stop projections 69 adjacent each pocket 51 at the ends of each transverse bolster portion 23 to cushion vertical engagement of the bolster and truck frame. To limit vertical separating movement of the bolster and truck frame and also to provide means for supporting brake levers in the plane of the wheels for the different lateral spacing on the axles, transversely spaced upstanding lugs 71 are formed on the truck frame adjacent opposite end walls of the spring pockets 39 and also at the outer ends of the side portions 11 of the truck frame 9. As best shown in Figures 4, 6 and 7 a brake lever 73 is pivoted at the upper end between each of the central and outside frame lugs 71 which are located so that the brake levers 73 are positioned in the plane of the wheels 2 and on opposite sides thereof by means of bolts 75 extending between adjacent aligned openings in the lugs when the wheels are secured to the axles outside the wheel spacing collars. An inverted U-shaped bolster retaining bar 77 is secured at opposite ends between each of the central and inside lugs 71 on opposite ends of the spring pockets 39 by the bolts 75 extending through these lugs and through openings in opposite ends of each of the retaining bars, the upstanding central portion of each bar 77 extending, as shown in Figure 6, over one of the outer ends of each of the transverse bolster portions 23. When the wheels are secured to the axles for operation on narrow gauge track and no spacing collars 3 are used the brake levers 73 are pivoted by the bolts 75 between the central and inside lugs 71 and in the plane of and on opposite sides of the wheels 2 and the bolster retaining bars 77 are secured at the ends by the bolts 75 between the central and outside lugs 71 adjacent each of the spring pockets 39.

The above described truck elements of simple form and arranged as shown provides a short wheel base truck for use on lightweight track of different track gauges and the simplified inclined bolster suspension means cushions relative vertical movement between the truck frame and bolster and tends to maintain the bolster in centered relation with respect to the frame and also cushions lateral swinging movement of the bolster relative to the frame within the limits imposed by the motion limiting means provided therebetween, certain of which means also serve to support brake levers in the plane and on opposite sides of the truck wheels and still provide room enough between the transverse portions of the truck frame and below the longitudinal portion of the bolster for traction motors mounted between each of the transverse truck frame portions and adjacent axles, each axle being operatively connected to and driven by one of these motors.

I claim:

1. In a railway vehicle truck, a truck frame having transversely spaced side frame portions and longitudinally spaced transverse portions spaced widely apart having a spring pocket at each of the junctions with the side frame portions, each of the pockets having transversely inwardly and downwardly inclined bottom surfaces, unguided helical compression springs supported on the inclined pocket surfaces and extending transversely inwardly and upwardly out of said pockets, a truck bolster having longitudinally spaced transversely extending arms whose extremities have pocket portions in which the upper ends of the springs bear, said arms being positioned on opposite sides of the transverse centerline of said frame and above said spaced transverse portions spaced widely apart, said arms acting with said unguided springs to resiliently center and suspend the bolster for relative vertical and lateral swinging movement above the truck frame, and stop means on the truck frame and bolster for limiting vertical, longitudinal and lateral swinging movement of the bolster relative to the truck frame.

2. In a railway vehicle truck, a truck frame having side frame portions spaced apart transversely and a pair of transverse portions having spring pockets, each provided with transversely downwardly and inwardly inclined seats, adjacent the ends adjoining the side portions inwardly from the ends thereof, a truck bolster having a longitudinally extending central portion having a central center plate and side bearings on opposite sides thereof, and transversely extending end portions overlying the truck frame transverse portions, each of the transversely extending bolster end portions having spring pockets in the opposite ends provided with upper spring seats, each parallel to and facing a spring seat in one of the truck frame spring pockets, a helical spring seated at the ends between the inclined seats of the truck frame and bolster pockets to suspend the bolster in unguided transverse centered relation on the truck frame and resiliently opposed transverse swinging and vertical relative movement thereof, said truck frame side portions having separate longitudinally outwardly facing, transversely inwardly facing and vertically upwardly facing stops adjacent each spring pocket and contactable by an adjacent end of the bolster to limit longitudinal, lateral and vertical movement of the bolster relative to the truck frame, the said longitudinally outwardly facing stops being arranged to permit only slight longitudinal movement and including thrust resistant wear surfaces, the other stops including cushioning means.

3. In a railway vehicle truck, a truck frame having transversely spaced side portions each provided with pedestal jaw portions for support on axle journal boxes and longitudinally spaced transversely extending frame portions, each portion having a spring pocket adjacent the ends adjoining the side frame portions, each of said spring pockets being remote from each other, a truck bolster having transversely outwardly extending end portions, each end portion having a spring pocket located above a spring pocket of the truck frame and a helical unguided supporting spring in each of the superposed bolster and truck frame pockets, the truck side frame portions having transversely spaced lugs on longitudinally opposite sides of each spring pocket for supporting truck frame brake rigging and bolster retaining means in different side by side relation and a plurality of bolster retaining means, each retaining means being secured at opposite ends to certain of said truck frame lugs on opposite ends of each spring pocket and extending over one end of a transversely extending bolster end portion to prevent vertical separation of the truck frame and bolster.

4. In a railway vehicle traction truck, an intermediate truck axle and separate outer end truck axles, each axle having outer end journal portions and elongated intermediate wheel seating portions, wheels adapted to be secured on said axle seating portions in different axial positions for different gauges of track, journal boxes on said axle journal portions, a truck frame having side frame portions provided with end and intermediate vertical pedestal jaw portions each embracing an axle journal box and supported thereon, and truck frame portions extending transversely between adjacent axles, an electric traction motor suspended on each axle and operatively connected thereto and having a nose suspended on one of the adjacent transverse truck frame portions, a truck bolster having end portions extending transversely above the transversely extending truck frame portions and a central portion extending between the end portions and over the traction motor operatively connected to the intermediate axle and between the wheels thereon and the outer ends of said transversely extending truck frame and bolster portions having pockets provided with facing spring seating surfaces inclined transversely inwardly and downwardly, a helical compression spring seated on the pocket seating surfaces, a plurality of means adjacent said truck frame and bolster pockets for limiting relative longitudinal, vertical and lateral movement of opposite ends of said springs, certain of said means being transversely spaced on opposite ends of the truck frame pockets to position certain of said motion limiting means and adjacent wheel brake levers in different side by side relation on the truck frame for different axial spacing of the wheels on the adjacent axles.

5. In a locomotive traction truck, a truck frame having side portions provided with vertical pedestal jaws adjacent the ends and intermediate the ends and transverse portions extending between the side portions and located intermediate the end and intermediate the pedestal jaws, said transverse frame portions having depressed spring pockets in the ends, truck axles having driving wheels thereon and outer end journals, journal boxes on the axle journals guided for vertical movement in the truck frame pedestal jaws, journal box coil springs positioned between the journal boxes and truck frame side portions, a traction motor supported at one side on each axle and operatively connected thereto and having a nose support on the other side suspended on an adjacent transverse truck frame portion, bolster coil springs in the spring pockets of the truck frame and a bolster having transverse end portions extending over the transverse frame portions and supported at the ends on the bolster springs for vertical and lateral movement and a longitudinal bolster portion extending between the transverse end portions and provided with a depressed center plate portion intermediate the ends, said truck frame having means thereon engageable with the inner sides, upper and lower faces and outer ends of the transverse end portions of the bolster to limit longitudinal, vertical and transverse movement of the bolster relative to the truck frame.

6. In a railway vehicle truck, a truck frame having side portions and a pair of widely spaced transverse portions extending between the side portions, said frame having depressed spring pockets substantially at the junctions of the side and transverse portions, unguided bolster coil springs in the spring pockets of the truck frame, a bolster having transverse end portions extending over the transverse frame portions and supported at the ends on said bolster springs for vertical and lateral movement and a longitudinal bolster portion extending between the transverse end portions and provided with a center plate portion intermediate the ends, said truck frame having means thereon engageable with the inner sides, upper and lower faces and outer ends of the transverse end portions of the bolster to limit longitudinal, vertical and transverse movement of the bolster and truck frame relative to each other, the said means limiting said relative longitudinal movement of the bolster and truck frame including wear resistant thrust plates spaced only sufficiently to permit vertical and transverse movement of the bolster and truck frame relative to each other.

References Cited in the file of this patent

UNITED STATES PATENTS

| | | |
|---|---|---|
| 264,991 | Anderson | Sept. 26, 1882 |
| 1,213,252 | Pilcher | Jan. 23, 1917 |
| 1,442,277 | Kiesel | Jan. 16, 1923 |
| 1,977,585 | Hedgcock | Oct. 16, 1934 |
| 2,132,001 | Dean | Oct. 4, 1938 |
| 2,238,593 | Kjolseth | Apr. 15, 1941 |
| 2,254,499 | Seelinger | Sept. 2, 1941 |
| 2,313,740 | Eksergian et al. | Mar. 16, 1943 |
| 2,492,337 | Travilla, Jr. | Dec. 27, 1949 |

FOREIGN PATENTS

| | | |
|---|---|---|
| 405,397 | Great Britain | Feb. 8, 1934 |